United States Patent
Hayashi et al.

(10) Patent No.: US 11,404,746 B2
(45) Date of Patent: Aug. 2, 2022

(54) BATTERY AND METHOD OF PRODUCING THE SAME

(71) Applicant: TOYOTA JIDOSHA KABUSHIKI KAISHA, Toyota (JP)

(72) Inventors: Kunihiko Hayashi, Anjo (JP); Ryuta Sugiura, Toyohashi (JP); Hiroto Asano, Nisshin (JP); Tsuyoshi Sasaki, Nagakute (JP); Chikaaki Okuda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 16/292,930

(22) Filed: Mar. 5, 2019

(65) Prior Publication Data
US 2019/0280270 A1    Sep. 12, 2019

(30) Foreign Application Priority Data

Mar. 7, 2018 (JP) .............................. JP2018-040761

(51) Int. Cl.
*H01M 50/446* (2021.01)
*H01M 50/46* (2021.01)
(Continued)

(52) U.S. Cl.
CPC ......... *H01M 50/446* (2021.01); *H01M 50/46* (2021.01); *H01M 10/0525* (2013.01); *H01M 50/491* (2021.01)

(58) Field of Classification Search
CPC ............... H01M 50/446; H01M 50/46; H01M 10/0525; H01M 50/491
See application file for complete search history.

(56) References Cited

U.S. PATENT DOCUMENTS

| 10,411,246 B2* | 9/2019 | Umehara | ................. H01M 4/62 |
| 2005/0079409 A1* | 4/2005 | Andelman | ............. H01G 9/155 |
| | | | 429/94 |

(Continued)

FOREIGN PATENT DOCUMENTS

| CN | 103311486 A | 9/2013 |
| CN | 105308772 A | 2/2016 |

(Continued)

OTHER PUBLICATIONS

Engineering Tool Box, (2003). Solids and Metals—Specific Gravities. [online] Available at: https://www.engineeringtoolbox.com/specific-gravity-solids-metals-d_293.html [Accessed Jun. 4, 2021]. (Year: 2003).*

*Primary Examiner* — Milton I Cano
*Assistant Examiner* — Jenna Shulman
(74) *Attorney, Agent, or Firm* — Sughrue Mion, PLLC

(57) ABSTRACT

A battery includes at least an electrode array and an electrolyte solution. The electrolyte solution contains at least a solvent and a supporting salt. The electrode array includes at least a positive electrode, a porous insulating layer, and a negative electrode. The porous insulating layer is interposed between the positive electrode and the negative electrode. The porous insulating layer contains at least a group of inorganic nanoparticles and a group of polymer particles. Each inorganic nanoparticle in the group of inorganic nanoparticles is a dielectric. Each inorganic nanoparticle in the group of inorganic nanoparticles is in contact with the electrolyte solution.

13 Claims, 5 Drawing Sheets

(51) Int. Cl.
   *H01M 50/491*   (2021.01)
   *H01M 10/0525*   (2010.01)

(56) References Cited

U.S. PATENT DOCUMENTS

| | | |
|---|---|---|
| 2010/0221965 A1 | 9/2010 | Katayama et al. |
| 2013/0280584 A1 | 10/2013 | Matsumura |
| 2016/0149209 A1* | 5/2016 | Jeon .................. H01M 4/62 |
| | | 429/217 |
| 2016/0190533 A1* | 6/2016 | Umehara .......... H01M 10/0587 |
| | | 429/94 |
| 2017/0331094 A1 | 11/2017 | Lee et al. |

FOREIGN PATENT DOCUMENTS

| | | |
|---|---|---|
| CN | 105742564 A | 7/2016 |
| JP | 2002-042791 A | 2/2002 |
| JP | 2013-161652 A | 8/2013 |
| JP | 2015-018813 A | 1/2015 |
| JP | 2016-119180 A | 6/2016 |
| JP | 2017-084822 A | 5/2017 |
| JP | 2017-538248 A | 12/2017 |
| WO | 2009/096451 A1 | 8/2009 |
| WO | 2012/073996 A1 | 6/2012 |
| WO | 2014/151202 A1 | 9/2014 |

\* cited by examiner

BATTERY AND METHOD OF PRODUCING THE SAME

This nonprovisional application is based on Japanese Patent Application No. 2018-040761 filed on Mar. 7, 2018 with the Japan Patent Office, the entire contents of which are hereby incorporated by reference.

BACKGROUND

Field

The present disclosure relates to a battery and a method of producing the same.

Description of the Background Art

Japanese Patent Laying-Open No. 2017-084822 discloses forming an inorganic particle layer on a surface of a separator.

SUMMARY

A separator is electrically insulating. The separator is interposed between a positive electrode and a negative electrode. The positive electrode and the negative electrode are separated from each other by the separator.

The separator is porous. The separator is impregnated with an electrolyte solution. The separator is typically a porous polymer film and/or a nonwoven fabric, for example.

The electrolyte solution contains a solvent and a supporting salt. The supporting salt dissociates in the solvent and, as a result, charge carriers (such as lithium ions) are generated. It is considered that the charge carriers moving between the positive electrode and the negative electrode operate the battery.

The resistance of the battery depends on the properties of the separator, including the thickness and the pore size. For example, the thinner the separator is and the greater the pore size is, the lower the resistance of the battery tends to be. It is considered that this low resistance is obtained as a result of a decrease in the effective distance that charge carriers need to move. For the separator to be capable of separating the positive electrode and the negative electrode from each other, it is considered that the properties of the separator including the thickness and the pore size should be limited to a certain extent.

An object of the present disclosure is to reduce battery resistance.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A battery includes at least an electrode array and an electrolyte solution. The electrolyte solution contains at least a solvent and a supporting salt. The electrode array includes at least a positive electrode, a porous insulating layer, and a negative electrode. The porous insulating layer is interposed between the positive electrode and the negative electrode. The porous insulating layer contains at least a group of inorganic nanoparticles and a group of polymer particles. Each inorganic nanoparticle in the group of inorganic nanoparticles is a dielectric. Each inorganic nanoparticle in the group of inorganic nanoparticles is in contact with the electrolyte solution.

In the battery according to the present disclosure, the porous insulating layer serves as a separator. The porous insulating layer contains the group of inorganic nanoparticles and the group of polymer particles. The porous insulating layer is impregnated with the electrolyte solution.

The porous insulating layer contains the group of inorganic nanoparticles. Each inorganic nanoparticle is a dielectric. The "dielectric" refers to a substance that can be polarized by an applied electric field. It is considered that an electric field is present between the positive electrode and the negative electrode in the battery. It is considered that the electric field in the battery polarizes the inorganic nanoparticles. The polarized inorganic nanoparticles when coming into contact with the supporting salt are expected to promote dissociation of the supporting salt, in other words, expected to increase the number of charge carriers. The increase in the number of charge carriers, the flow of which forms an electric current, is expected to reduce battery resistance.

The inorganic nanoparticles are of the nanometer-scale. More specifically, the inorganic nanoparticles have an average particle size not smaller than 1 nm and not greater than 100 nm. Conventionally, a study is conducted on forming an inorganic particle layer on a surface of a separator (porous polymer film) (see Japanese Patent Laying-Open No. 2017-084822). The inorganic particle layer can give heat resistance to the separator, for example. It should be noted that the inorganic particles used in this study are of the micrometer-scale. Inorganic particles of the micrometer-scale, even when they are dielectric, are not expected to have an effect of promoting dissociation of a supporting salt.

The battery according to the present disclosure, in which the dielectric is of the nanometer-scale, is expected to have an effect of promoting dissociation of a supporting salt. The detailed mechanism of this phenomenon is unclear at this point, but the following mechanism can be envisaged as an example: because of its nanometer-scale size, the dielectric can behave as if it is solvated with charge carriers (ions) and can consequently promote dissociation of a supporting salt.

In another conventional study, inorganic nanoparticles are mixed with a polymer and the resulting mixture is formed into a film, which is then stretched to form a separator (porous film). In this aspect, the inorganic nanoparticles are considered enclosed within the polymer. The inorganic nanoparticles thus enclosed within the polymer do not come into contact with the electrolyte solution (supporting salt) and, therefore, no effect of promoting dissociation of the supporting salt is expected to be obtained.

In the battery according to the present disclosure, the porous insulating layer contains a group of polymer particles. Because the polymer is not in film form but in particle form, it is considered that the inorganic nanoparticles are not enclosed within the polymer but instead can come into contact with the electrolyte solution.

In addition, this configuration in which the porous insulating layer contains the group of polymer particles can give the porous insulating layer a shut-down function. The "shut-down function" refers to a function of interrupting the current flow by closing the pores in the separator at the time when, for example, the battery generates heat. When the battery generates heat, the polymer particles contained in the porous insulating layer are expected to melt, then close the gaps between the particles, and consequently interrupt the current flow.

The porous insulating layer containing the group of polymer particles is expected to give elasticity to the porous insulating layer. Typically, the positive electrode and the negative electrode undergo expansion and shrinking while the battery is being charged and discharged. For example, it is considered that expansion of the positive electrode and the negative electrode pushes the porous insulating layer and thereby decreases the thickness of the porous insulating layer. If the thickness of the porous insulating layer thus decreases, the battery performance can change. But in the configuration in which the porous insulating layer is elastic, the porous insulating layer is capable of restoring its thickness when the positive electrode and the negative electrode shrink. This restoring capability is expected to, for example, improve long-term stability of battery performance.

[2] The group of inorganic nanoparticles and the group of polymer particles may satisfy the following relationship:

(group of inorganic nanoparticles):(group of polymer particles)=50:50 to 95:5 (volume ratio).

When the ratio of the volume of the group of polymer particles relative to the total volume of the group of inorganic nanoparticles and the group of polymer particles is not lower than 5%, the shut-down function and the elasticity are expected to be improved. When the volume ratio of the group of inorganic nanoparticles is not lower than 50%, a great effect of reducing resistance tends to be obtained.

[3] Each inorganic nanoparticle in the group of inorganic nanoparticles may be a ferroelectric.

The "ferroelectric" refers to a substance that is polarized without an applied electric field. When each inorganic nanoparticle is a ferroelectric, a great effect of promoting dissociation of a supporting salt is expected to be obtained.

[4] The porous insulating layer may be supported on at least one of a surface of the positive electrode and a surface of the negative electrode.

When the porous insulating layer is supported on at least one of the surfaces of the electrodes, the effective distance that charge carriers need to move is expected to be reduced.

[5] The electrode that supports the porous insulating layer may have a three-dimensional network structure.

Typically, electrodes (positive electrode and negative electrode) of a battery are plate-shaped electrodes. Recently, an electrode having a cubic structure has been researched. A battery that includes such an electrode is also called "three-dimensional battery". In a three-dimensional battery, the effective distance that charge carriers need to move is expected to be reduced and, furthermore, the reaction area (the area of a region across which two electrodes face to each other) per unit volume is expected to be increased. Therefore, the battery is expected to have a high power and a high energy density.

As an example of the electrode having a cubic structure, an electrode having a three-dimensional network structure is considered. To separate two electrodes from each other, each having a three-dimensional network structure, by a film-shape separator is considered difficult. By the way, the porous insulating layer according to the present disclosure may be formed by, for example, causing deposition of a group of inorganic nanoparticles and a group of polymer particles on a surface of an electrode. This deposition technique is considered capable of forming a porous insulating layer that follows the contour of the electrode having a three-dimensional network structure.

[6] A method of producing a battery according to the present disclosure includes at least the following (a) to (d):

(a) preparing a positive electrode and a negative electrode;

(b) forming a porous insulating layer by depositing a group of inorganic nanoparticles and a group of polymer particles on at least one of a surface of the positive electrode and a surface of the negative electrode with electrophoretic deposition;

(c) forming an electrode array by disposing the positive electrode and the negative electrode in such a way that the porous insulating layer is interposed between the positive electrode and the negative electrode; and (d) impregnating the electrode array with an electrolyte solution to produce a battery.

The electrolyte solution contains at least a solvent and a supporting salt. Each inorganic nanoparticle in the inorganic nanoparticles is a dielectric. Each inorganic nanoparticle in the inorganic nanoparticles is in contact with the electrolyte solution by impregnating the electrode array with the electrolyte solution.

Formation of the porous insulating layer by electrophoretic deposition (EPD) is expected to make the inorganic nanoparticles be close to each other within the porous insulating layer. When the inorganic nanoparticles are thus close to each other, a great effect of promoting dissociation of a supporting salt is expected to be obtained. EPD is considered a suitable technique for forming a porous insulating layer on a surface of an electrode having a cubic structure.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

In the following, embodiments according to the present disclosure (herein called "present embodiment") are described. The scope of claims is not limited to the description below. For example, the below description is mainly on a lithium-ion secondary battery. But a lithium-ion secondary battery is merely an example of the battery according to the present embodiment. The battery according to the present embodiment may be a sodium-ion secondary battery and/or a nickel-hydride secondary battery, for example. The battery is not limited to a secondary battery. The battery may be a primary battery.

The phrase "at least one of A and B" herein encompasses, for example, all the following cases: only A, only B, and both A and B. A positive electrode and a negative electrode herein can be collectively called "electrode".

<Battery>

Figure 1:
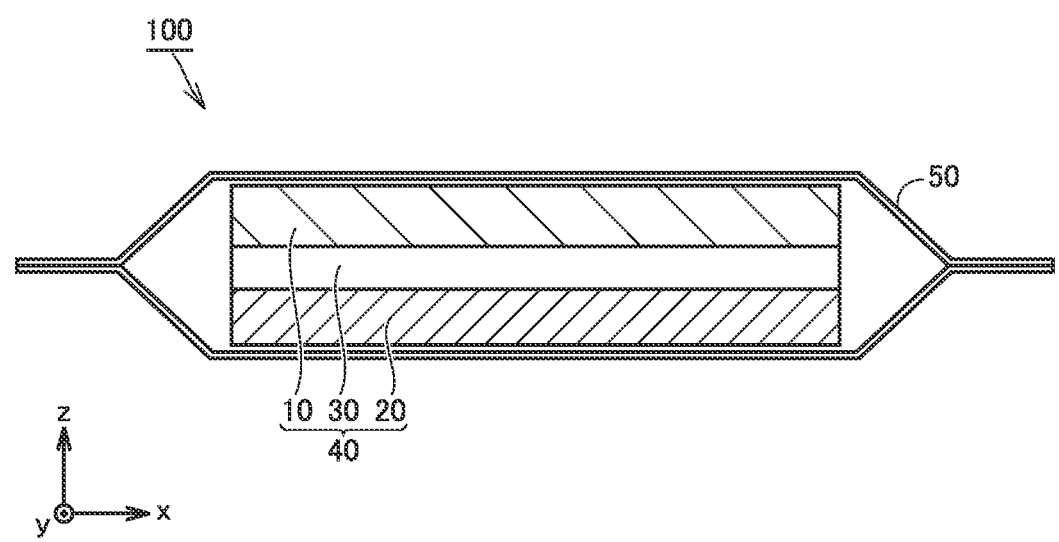
FIG. 1 is a conceptual sectional view illustrating the structure of the battery according to the present embodiment.

FIG. 1 is a conceptual sectional view illustrating the structure of the battery according to the present embodiment.

A battery 100 includes a case 50. Case 50 is hermetically sealed. Case 50 may be, for example, a pouch made of an aluminum-laminated film. Case 50 may be a hermetically sealed metal container, for example. Case 50 accommodates an electrode array 40 and an electrolyte solution (not shown). In other words, battery 100 includes at least electrode array 40 and an electrolyte solution.

<<Electrode Array>>

Electrode array 40 includes at least a positive electrode 10, a porous insulating layer 30, and a negative electrode 20. Electrode array 40 may substantially consist of positive electrode 10, porous insulating layer 30, and negative electrode 20. Porous insulating layer 30 is interposed between positive electrode 10 and negative electrode 20. Electrode array 40 may be a stack-type one, for example. More specifically, electrode array 40 may be formed by alternately stacking one positive electrode 10 and one negative electrode 20 and then repeating this alternate stacking process more than once. In each space between positive electrode 10 and negative electrode 20, porous insulating layer 30 is interposed. Electrode array 40 may be a wound-type one. More specifically, electrode array 40 may be formed by stacking positive electrode 10, porous insulating layer 30, and negative electrode 20 in this order and then winding them in a spiral fashion.

<<Porous Insulating Layer>>

Porous insulating layer 30 serves as a separator of battery 100. Porous insulating layer 30 is expected to have an effect of promoting dissociation of a supporting salt. As a result, battery 100 is expected to have a low resistance.

Desirably, porous insulating layer 30 fills the gap between positive electrode 10 and negative electrode 20. When another structure (such as a porous polymer film) is interposed between positive electrode 10 and negative electrode 20 in addition to porous insulating layer 30, resistance can be increased by an increment corresponding to the thickness of that another structure.

Porous insulating layer 30 may be a self-standing layer, for example. The "self-standing layer" refers to a layer that retains its shape on its own. Porous insulating layer 30 may be a non-self-standing layer. The "non-self-standing layer" refers to a layer that is formed on a surface of a support and cannot retain its shape on its own. For example, porous insulating layer 30 may be formed on a surface of positive electrode 10. For example, porous insulating layer 30 may be formed on a surface of negative electrode 20. For example, porous insulating layer 30 may be formed on both a surface of positive electrode 10 and a surface of negative electrode 20. In other words, porous insulating layer 30 may be supported on at least one of a surface of positive electrode 10 and a surface of negative electrode 20.

Porous insulating layer 30 may have a thickness not smaller than 5 μm and not greater than 50 μm, for example. The thickness is measured in a cross-sectional micrograph of porous insulating layer 30. As the microscope for use in the present embodiment, a microscope suitable for the subject of measurement is selected. The microscope may be an optical microscope. The microscope may be a scanning electron microscope (SEM). The microscope may be a transmission electron microscope (TEM). The thickness is measured at least three positions. The arithmetic mean of these at least three thickness measurements is used. Porous insulating layer 30 may have a thickness not smaller than 10 μm and not greater than 30 μm, for example. Porous insulating layer 30 may have a thickness not smaller than 15 μm and not greater than 25 μm, for example. Porous insulating layer 30 may have a thickness not smaller than 20 μm and not greater than 25 μm, for example.

Porous insulating layer 30 may have a porosity not lower than 10% and not higher than 90%, for example. The porosity is measured in a cross-sectional micrograph (typically a cross-sectional SEM micrograph) of porous insulating layer 30. The specific procedure of the measurement is as follows: the cross-sectional micrograph of porous insulating layer 30 is processed to determine the total area of pores, which is then divided by the area of porous insulating layer 30 to calculate the porosity. The porosity is measured in at least three cross-sectional micrographs. The arithmetic mean of these at least three measurements is used. Porous insulating layer 30 may have a porosity not lower than 20% and not higher than 80%, for example. Porous insulating layer 30 may have a porosity not lower than 30% and not higher than 70%, for example.

Figure 2:
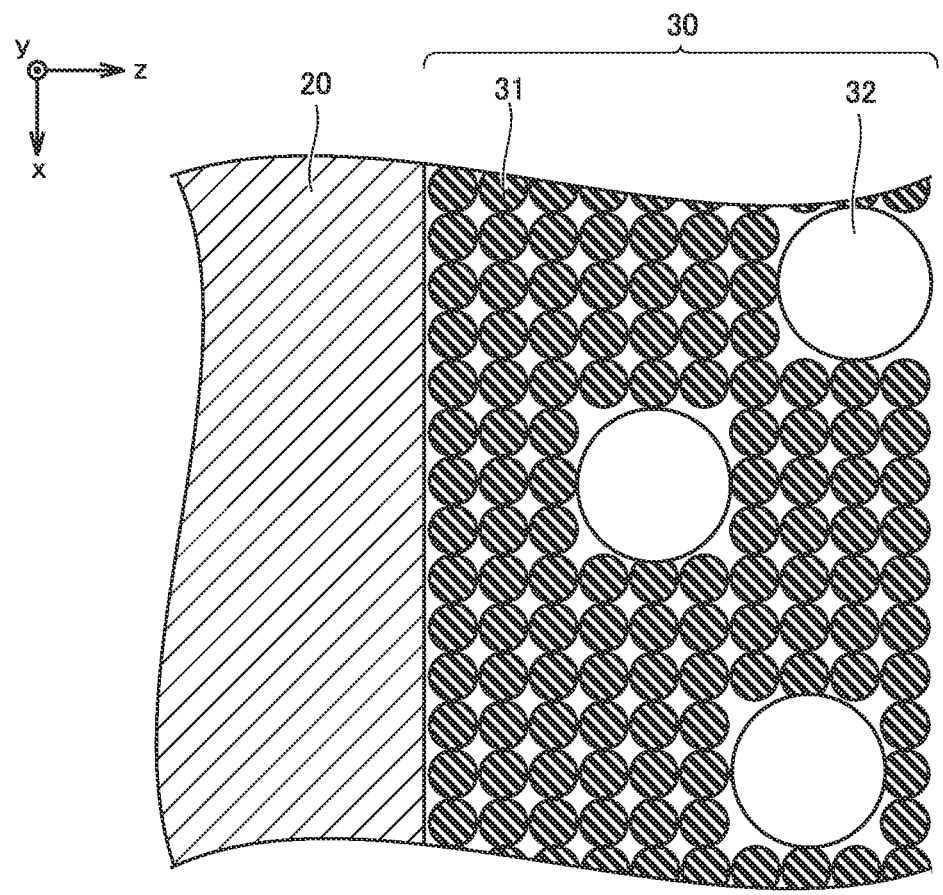
FIG. 2 is a conceptual sectional view illustrating the structure of the porous insulating layer according to the present embodiment.

FIG. 2 is a conceptual sectional view illustrating the structure of the porous insulating layer according to the present embodiment.

Porous insulating layer 30 is a particle layer. In porous insulating layer 30, pores correspond to the gaps between particles. Porous insulating layer 30 contains at least a group of inorganic nanoparticles 31 and a group of polymer particles 32. Porous insulating layer 30 may substantially consist of group of inorganic nanoparticles 31 and the group of polymer particles. Porous insulating layer 30 may further contain a binder as needed, for example.

(Group of Inorganic Nanoparticles)

Group of inorganic nanoparticles 31 is a group of inorganic nanoparticles. Each inorganic nanoparticle in group of inorganic nanoparticles 31 is a dielectric. Each inorganic nanoparticle in group of inorganic nanoparticles 31 is in contact with the electrolyte solution. When each inorganic nanoparticle is in contact with the electrolyte solution, it is considered that an effect of promoting dissociation of a supporting salt is exhibited.

The inorganic nanoparticles have an average particle size not smaller than 1 nm and not greater than 100 nm. The average particle size of the inorganic nanoparticles refers to a harmonic mean particle size (diameter) based on scattering light intensity. The average particle size of the inorganic nanoparticles is measured by a method in accordance with "JIS Z 8828: Particle Size Analysis, Dynamic Light Scattering". The inorganic nanoparticles may have an average particle size not smaller than 1 nm and not greater than 50 nm, for example. The inorganic nanoparticles may have an average particle size not smaller than 7 nm and not greater than 25 nm, for example. The shape of the inorganic nanoparticles is not particularly limited. The inorganic nanoparticles may be spherical particles, rod-like particles, and/or plate-like particles, for example. The inorganic nanoparticles may be porous particles, for example.

Each inorganic nanoparticle is a dielectric. The dielectric may have a relative permittivity not lower than 3, for example. The "relative permittivity" herein refers to a value measured at a frequency of 1 MHz. The relative permittivity may be a value specified in a document, such as a value specified in "Kagaku Binran (Handbook of Chemistry) (edited by The Chemical Society of Japan, issued by Maruzen Publishing, Co., Ltd.)", for example. The dielectric may have a relative permittivity not lower than 5, for example. The dielectric may have a relative permittivity not lower than 10, for example.

The inorganic nanoparticles are particles of an inorganic compound or inorganic compounds. The inorganic nanoparticles may be particles of silica ($SiO_2$, such as fumed silica), titania ($TiO_2$), alumina ($Al_2O_3$), boehmite ($Al_2O_3 \cdot H_2O$), magnesia (MgO), and/or zirconia ($ZrO_2$), for example. One type of the inorganic nanoparticles may be used alone. Two or more types of the inorganic nanoparticles may be used in combination. In other words, inorganic nanoparticles 31 may contain two or more types of the inorganic nanoparticle. The inorganic nanoparticles may be, for example, at least one selected from the group consisting of silica, titania, alumina, boehmite, magnesia, and zirconia.

Each inorganic nanoparticle may be a ferroelectric. When each inorganic nanoparticle is a ferroelectric, a great effect of promoting dissociation of a supporting salt is expected to be obtained. The ferroelectric may have a relative permittivity not lower than 100, for example. The ferroelectric may have a relative permittivity not lower than 500, for example. The ferroelectric may have a relative permittivity not lower than 1000, for example.

The ferroelectric may be barium titanate ($BaTiO_3$), strontium titanate ($SrTiO_3$), lead zirconate titanate [$Pb(Zr_xTi_{1-x})O_3$] ($0<x<1$), and/or potassium sodium tartrate ($KNaC_4H_4O_6$), for example. In other words, the inorganic nanoparticles may be particles of, for example, at least one selected from the group consisting of barium titanate, strontium titanate, lead zirconate titanate, and potassium sodium tartrate.

The inorganic nanoparticles may be particles of, for example, at least one selected from the group consisting of silica, titania, alumina, boehmite, magnesia, zirconia, barium titanate, strontium titanate, lead zirconate titanate, and potassium sodium tartrate. The inorganic nanoparticles may be particles of, for example, at least one selected from the group consisting of silica and barium titanate.

(Group of Polymer Particles)

Porous insulating layer 30 further contains group of polymer particles 32. Because the polymer is not in film form but in particle form, it is considered that the inorganic nanoparticles are not enclosed within the polymer but instead can come into contact with the electrolyte solution. In addition, this configuration in which porous insulating layer 30 contains group of polymer particles 32 can give porous insulating layer 30 a shut-down function and elasticity.

Group of polymer particles 32 is a group of polymer particles. The polymer particles in group of polymer particles 32 may have an average particle size not smaller than 1 μm and not greater than 10 μm, for example. The average particle size of the polymer particles may be measured by the Coulter method, for example.

From the viewpoint of the shut-down function, the melting point of the polymer particles may be not lower than 80° C. and not higher than 160° C., for example, and the melting point of the polymer particles may be not lower than 80° C. and not higher than 120° C., for example. The "melting point of the polymer particles" refers to the peak-top temperature of the melting peak obtained by differential scanning calorimetry (DSC). DSC may be carried out in accordance with "JIS K 7121: Testing Methods for Transition Temperatures of Plastics". The melting point of the polymer particles may be adjusted by changing the molecular weight, the density, and/or the like of the polymer.

The polymer particles may be polyethylene (PE) particles and/or polypropylene (PP) particles, for example. One type of the polymer particles may be used alone. Two or more types of the polymer particles may be used in combination. In other words, group of polymer particles 32 may contain two or more types of the polymer particles. The polymer particles may be, for example, at least one selected from the group consisting of PE particles and PP particles.

(Volume ratio between group of inorganic nanoparticles and group of polymer particles)

Group of inorganic nanoparticles 31 and group of polymer particles 32 may satisfy, for example, the following relationship:

"(group of inorganic nanoparticles):(group of polymer particles)=25:75 to 95:5 (volume ratio)".

The volume ratio between group of inorganic nanoparticles 31 and group of polymer particles 32 is measured in a cross-sectional micrograph (typically a cross-sectional SEM micrograph) of porous insulating layer 30. The micrograph may include a rectangular area measuring 50 μm by 50 μm, for example. By processing the cross-sectional micrograph of porous insulating layer 30, the total area of group of inorganic nanoparticles 31 and the total area of group of polymer particles 32 are determined. The ratio between the total area of group of inorganic nanoparticles 31 and the total area of group of polymer particles 32 is regarded as the volume ratio between group of inorganic nanoparticles 31 and group of polymer particles 32. The volume ratio between group of inorganic nanoparticles 31 and group of polymer particles 32 is measured in at least three cross-sectional micrographs. The arithmetic mean of these at least three measurements is used.

When the ratio of the volume of group of polymer particles 32 to the total volume of group of inorganic nanoparticles 31 and group of polymer particles 32 is not lower than 5%, porous insulating layer 30 is expected to have an improved shut-down function and an improved elasticity. Group of inorganic nanoparticles 31 and group of polymer particles 32 may satisfy the following relationship:

"(group of inorganic nanoparticles):(group of polymer particles)=50:50 to 95:5 (volume ratio)".

When the volume ratio of group of inorganic nanoparticles 31 is not lower than 50%, a great effect of reducing resistance tends to be obtained. Group of inorganic nanoparticles 31 and group of polymer particles 32 may satisfy the following relationship:

"(group of inorganic nanoparticles):(group of polymer particles)=75:25 to 95:5 (volume ratio)".

(Other Components)

Porous insulating layer 30 may further contain a binder, as needed. The content of the binder may be, for example, not lower than 0.1 part by mass and not higher than 10 parts by mass relative to 100 parts by mass of group of inorganic nanoparticles 31. The content of the binder may be, for example, not lower than 1 part by mass and not higher than 5 parts by mass relative to 100 parts by mass of group of inorganic nanoparticles 31. The binder is not particularly limited. The binder may be carboxymethylcellulose (CMC), styrene-butadiene rubber (SBR), polytetrafluoroethylene (PTFE), polyvinylidene difluoride (MiIf), vinylidene fluoride-hexafluoropropene copolymer (PVdF-HFP), and/or polyacrylic acid (PAA), for example. One type of the binder may be used alone. Two or more types of the binder may be used in combination.

<<Electrolyte Solution>>

Electrode array 40 is impregnated with the electrolyte solution. At least porous insulating layer 30 is impregnated with the electrolyte solution. Both positive electrode 10 and negative electrode 20 may be impregnated with the electrolyte solution. The electrolyte solution contains a solvent and a supporting salt. When the electrolyte solution has porous insulating layer 30 impregnated therewith, dissociation of the supporting salt in the electrolyte solution is expected to be promoted.

The solvent is not particularly limited. The solvent may be ethylene carbonate (EC), propylene carbonate (PC), butylene carbonate (BC), fluoroethylene carbonate (FEC), dimethyl carbonate (DMC), ethyl methyl carbonate (EMC), diethyl carbonate (DEC), γ-butyrolactone (GBL), δ-valerolactone, tetrahydrofuran (THF), 1,3-dioxolane, 1,4-dioxane, 1,2-dimethoxyethane (DMF), methyl formate (MF), methyl acetate (MA), methyl propionate (MP), and/or ionic liquid, for example. One type of the solvent may be used alone. Two or more types of the solvent may be used in combination.

In an ordinary lithium-ion secondary battery, a mixture of a cyclic carbonate (such as EC) and a chain carbonate (such as DMC) is used as solvent. EC, for example, has a high relative permittivity and therefore it is considered that EC promotes dissociation of the supporting salt. Because of its high viscosity, EC, for example, is mixed with a low-viscosity solvent such as DMC before used as solvent. In the present embodiment in which porous insulating layer 30 can promote dissociation of the supporting salt, the amount of cyclic carbonate such as EC may be reduced. This reduction in the amount of cyclic carbonate is expected to reduce the viscosity of the solvent and the battery resistance.

In an ordinary solvent, the volume ratio of cyclic carbonate is about 30%. In the solvent according to the present embodiment, the volume ratio of cyclic carbonate may be not higher than 20%, for example; the volume ratio of cyclic carbonate may be not higher than 10%, for example; and the volume ratio of cyclic carbonate may be not higher than 5%, for example. For example, the solvent may contain substantially no cyclic carbonate.

The electrolyte solution may contain the supporting salt in an amount not lower than 0.5 mol/L, and not higher than 2 mol/L (not lower than 0.5 M and not higher than 2 M), for example. The supporting salt may be $LiPF_6$, $LiBF_4$, $Li[N(FSO_2)_2]$, and/or $Li[N(CF_3SO_2)_2]$, for example. One type of the supporting salt may be used alone. Two or more types of the supporting salt may be used in combination.

The electrolyte solution may further contain various additives. The additives may be cyclohexylbenzene (CHB), biphenyl (BP), vinylene carbonate (VC), vinylethylene carbonate (VEC), $Li[B(C_2O_4)_2]$, $LiPO_2F_2$, propane sultone (PS), and/or ethylene sulfite (ES), for example. One type of the additives may be used alone. Two or more types of the additives may be used in combination.

<<Positive Electrode>>

Positive electrode 10 is in sheet form, for example. Positive electrode 10 may have a three-dimensional network structure, for example. The electrode having a three-dimensional network structure is described below. Positive electrode 10 includes at least positive electrode active material particles. Positive electrode 10 may further include a positive electrode current collector, a conductive material, and a binder, for example. The positive electrode current collector may be made of aluminum (Al) foil, for example. The positive electrode current collector may have a thickness not smaller than 5 μm and not greater than 30 μm, for example. Positive electrode 10 may be formed by, for example, disposing the positive electrode active material particles, the conductive material, and the binder on a surface of the positive electrode current collector. The positive electrode active material particles, the conductive material, and the binder may form a positive electrode active material layer on a surface of the positive electrode current collector. The positive electrode active material layer may have a thickness not smaller than 1 μm and not greater than 100 μm, for example. Porous insulating layer 30 may be supported on a surface of the positive electrode active material layer.

The positive electrode active material particles are particles that contain a positive electrode active material. The positive electrode active material particles may substantially consist of the positive electrode active material. The shape of the positive electrode active material particles is not particularly limited. The positive electrode active material particles may be spherical and/or in lumps, for example. The positive electrode active material particles may have a D50 not lower than 1 μm and not higher than 30 μm, for example. The "D50" refers to the particle size in particle size distribution obtained by laser diffraction and scattering at which the cumulative particle volume (accumulated from the side of small sizes) reaches 50% of the total particle volume.

The positive electrode active material is not particularly limited. The positive electrode active material may be lithium cobalt oxide, lithium nickel oxide, lithium manganese oxide, lithium nickel cobalt manganese oxide (also called "NCM"), lithium nickel cobalt alutninate (also called "NCA"), and/or lithium iron phosphate, for example. One type of the positive electrode active material may be used alone. Two or more types of the positive electrode active material may be used in combination.

The content of the conductive material may be, for example, not lower than 0.1 part by mass and not higher than 10 parts by mass relative to 100 parts by mass of the positive electrode active material particles. The conductive material is not particularly limited. The conductive material may be acetylene black (AB), carbon nanotubes (CNT), and/or metal short fibers, for example. One type of the conductive material may be used alone. Two or more types of the conductive material may be used in combination.

The content of the binder may be, for example, not lower than 0.1 part by mass and not higher than 10 parts by mass relative to 100 parts by mass of the positive electrode active material particles. The binder is not particularly limited. The binder may be PVH, for example. One type of the binderbe used alone. Two or more types of the binder may be used in combination.

<<Negative Electrode>>

Negative electrode 20 is in sheet form, for example. Negative electrode 20 may have a three-dimensional network structure, for example. Negative electrode 20 includes at least negative electrode active material particles. Negative electrode 20 may further include a negative electrode current collector, a conductive material, and a binder, for example. The negative electrode current collector may be made of copper (Cu) foil, for example. The negative electrode current collector may have a thickness not smaller than 5 μm and not greater than 30 μm, for example. Negative electrode 20 may be formed by, for example, disposing the negative electrode active material particles, the conductive material, and the binder on a surface of the negative electrode current collector. The negative electrode active material particles, the conductive material, and the binder may form a negative electrode active material layer on a surface of the negative electrode current collector. The negative electrode active material layer may have a thickness not smaller than 1 μm and not greater than 100 µm, for example. Porous insulating layer 30 may be supported on a surface of the negative electrode active material layer.

The negative electrode active material particles are particles that contain a negative electrode active material. The negative electrode active material particles may substantially consist of the negative electrode active material. The shape of the negative electrode active material particles is not particularly limited. Negative electrode active material particles may be spherical, in lumps, or in flakes, for example. Negative electrode active material particles may have a D50 not lower than 1 µm and not higher than 30 µm, for example.

The negative electrode active material is not particularly limited. The negative electrode active material may be graphite, soft carbon, hard carbon, silicon, silicon-based alloy, silicon oxide, tin, tin-based alloy, tin oxide, and/or lithium titanate oxide, for example. One type of the negative electrode active material may be used alone. Two or more types of the negative electrode active material may be used in combination.

The content of the conductive material may be, for example, not lower than 0.1 part by mass and not higher than 10 parts by mass relative to 100 parts by mass of the negative electrode active material particles. The conductive material is not particularly limited. The conductive material may be, for example, a material described above as an example of the conductive material of positive electrode 10. One type of the conductive material may be used alone. Two or more types of the conductive material may be used in combination. When a negative electrode active material with an excellent conductivity, such as graphite, is used, the conductive material may be unnecessary.

The content of the binder may be, for example, not lower than 0.1 part by mass and not higher than 10 parts by mass relative to 100 parts by mass of the negative electrode active material particles. The binder is not particularly limited. The binder may be SBR and/or CMC, for example. One type of the binder may be used alone. Two or more types of the binder may be used in combination.

<<Three-Dimensional Electrode>>

An electrode having a cubic structure is called "three-dimensional electrode" herein. The electrode having a cubic structure may be formed by, for example, using a current collector having a cubic structure as the substrate. The electrode may have a three-dimensional network structure, for example. It is considered that porous insulating layer 30 supported by an electrode having a three-dimensional network structure also has a three-dimensional network structure.

The "three-dimensional network structure" herein refers to a structure that satisfies the following conditions (i) and (ii):

(i) the structure extends in at least three directions in a three-dimensional space; and (ii) there is no single plane on which all these directions can lie.

The three-dimensional network structure may be a regular (periodic) structure. The regular three-dimensional network structure may be a gyroid structure or an inverse-opal structure, for example. The three-dimensional network structure may be an irregular structure.

The current collector having a three-dimensional network structure may be a porous metal material (such as foam metal) and/or a porous carbon material, for example. The current collector (porous metal material) may be "Celmet (registered trademark)" manufactured by Sumitomo Electric Industries, Ltd., for example. The porous metal material may be made of nickel (Ni), Al, and/or Cu, for example.

The porous metal material may have a porosity not lower than 25% and not higher than 75%, for example. The porosity refers to the ratio (in volume) of the pores to the porous metal material. The "porosity" is calculated by the following formula:

$$\text{Porosity} = \{1-((\text{apparent specific gravity of porous metal material})/(\text{true specific gravity of constituent metal of porous metal material}))\} \times 100.$$

The apparent specific gravity refers to the value of specific gravity calculated from the outer dimensions of the porous metal material.

The porous metal material has a plurality of pores. The average pore size of the porous metal material may be not smaller than 50 µm and not greater than 1000 µm, for example. The average pore size is measured as follows. The number of pores per unit length of an outer surface of the porous metal material is counted. The reciprocal of the resulting number of pores per unit length is used as the average pore size. The average pore size is measured at least three times. The arithmetic mean of these at least three measurements is used.

Figure 3:
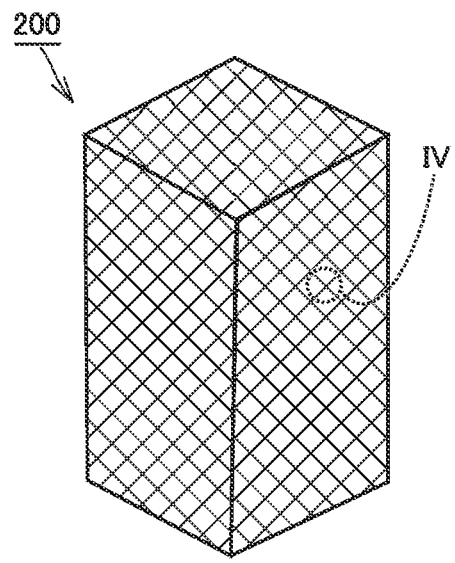
FIG. 3 is a first conceptual view illustrating the three-dimensional electrode according to the present embodiment.

FIG. 3 is a first conceptual view illustrating the three-dimensional electrode according to the present embodiment.

A three-dimensional electrode 200 has a three-dimensional network structure. Three-dimensional electrode 200 has a prismatic outer profile. However, the outer profile of three-dimensional electrode 200 is not particularly limited. Three-dimensional electrode 200 may have a sheet-like outer profile, a cylindrical outer profile, or a disc-like outer profile, for example.

Figure 4:
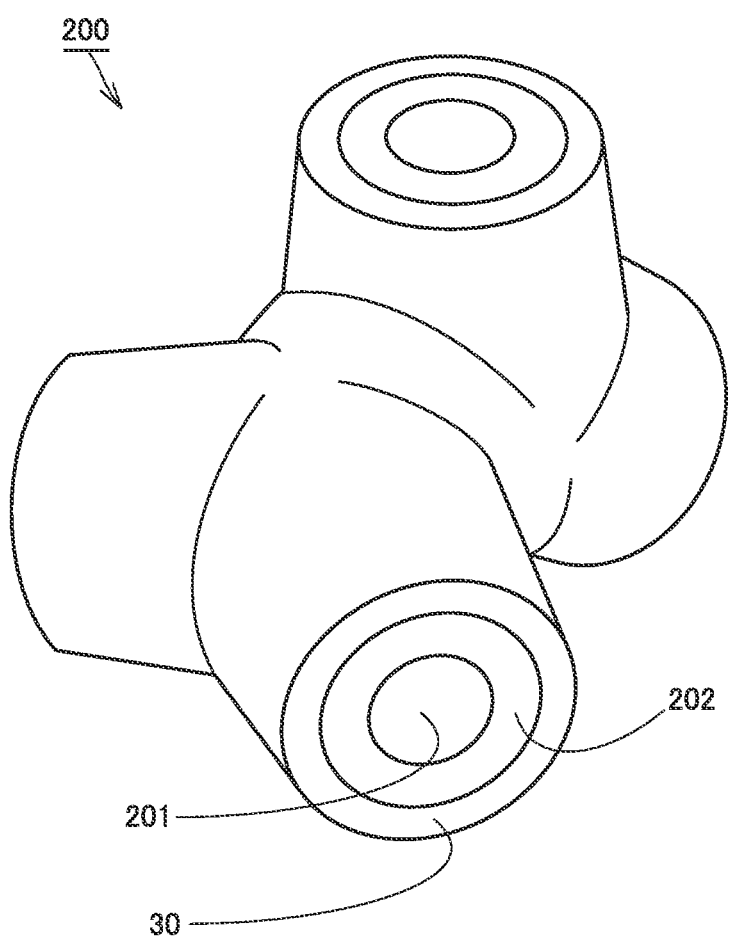
FIG. 4 is a second conceptual view illustrating the three-dimensional electrode according to the present embodiment.

FIG. 4 is a second conceptual view illustrating the three-dimensional electrode according to the present embodiment.

FIG. 4 conceptually illustrates a portion (portion IV in FIG. 3) of the inside part of three-dimensional electrode 200. Three-dimensional electrode 200 includes a three-dimensional current collector 201. Three-dimensional current collector 201 has a three-dimensional network structure. Three-dimensional current collector 201 has an active material layer 202 formed on a surface thereof. Active material layer 202 may be a positive electrode active material layer. The positive electrode active material layer contains at least the positive electrode active material particles. Active material layer 202 may be a negative electrode active material layer. The negative electrode active material layer contains at least the negative electrode active material particles. Active material layer 202 extends following a surface of three-dimensional current collector 201. Therefore, active material layer 202 also has a three-dimensional network structure.

Active material layer 202 has porous insulating layer 30 formed on a surface thereof. Porous insulating layer 30 contains at least group of inorganic nanoparticles 31 (see FIG. 2). Porous insulating layer 30 may further contain group of polymer particles 32 (see FIG. 2). Porous insulating layer 30 extends following a surface of active material layer 202. Therefore, porous insulating layer 30 also has a three-dimensional network structure. By further forming a counter electrode on a surface of porous insulating layer 30, an electrode array may be formed. The "counter electrode" refers to an active material layer or an electrode either of which has a polarity opposite to the polarity of active material layer 202. The counter electrode may be formed so that it fills the pores. The pores correspond to the space that is not occupied by any of three-dimensional current collector 201, active material layer 202, and porous insulating layer 30.

When battery 100 includes three-dimensional electrode 200, the active material layers (namely, the electrodes) are cubically adjacent to each other. This arrangement is expected to reduce the effective distance that charge carriers need to move. This arrangement is also expected to increase the reaction area per unit volume. As a result, battery 100 is expected to have a high power and a high energy density.

<Method of Producing Battery>

Battery 100 according to the present embodiment may be produced by, for example, a production method described below.

Figure 5:
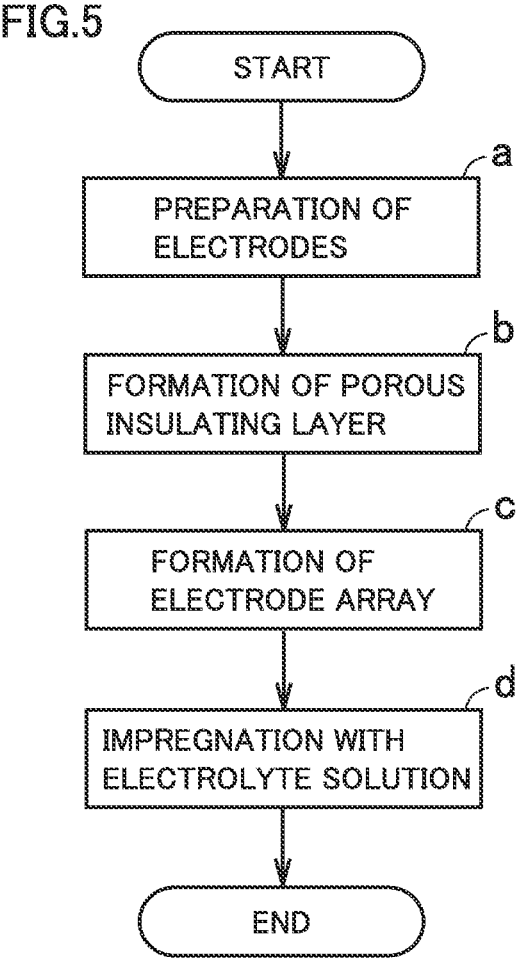
FIG. 5 is a flow chart illustrating the method of producing a battery according to the present embodiment.

FIG. 5 is a flow chart illustrating the method of producing a battery according to the present embodiment.

The method of producing a battery according to the present embodiment includes at least "(a) preparation of electrodes", "(b) formation of a porous insulating layer", "(c) formation of an electrode array", and "(d) impregnation with an electrolyte solution".

<<(a) Preparation of Electrodes>>

The method of producing a battery according to the present embodiment includes preparing positive electrode 10 and negative electrode 20.

Positive electrode 10 may be prepared by, for example, applying a suspension that contains the positive electrode active material particles, the binder, and the like to a surface of a planar positive electrode current collector (such as an Al foil sheet) and then drying the resultant. The positive electrode active material particles, for example, are described above in detail. After drying, positive electrode 10 may be rolled and cut into predetermined outer dimensions.

Negative electrode 20 may be prepared by, for example, applying a suspension that contains the negative electrode active material particles, the binder, and the like to a surface of a planar negative electrode current collector (such as a Cu foil sheet) and then drying the resultant. After drying, negative electrode 20 may be rolled and cut into predetermined outer dimensions.

In the case in which three-dimensional current collector 201 (such as a porous Ni material) is used, a technique such as dipping may be carried out for preparing positive electrode 10 or negative electrode 20. The "dipping" refers to a technique of dipping a work (coating subject) in a coating liquid, then taking the work out of the coating liquid, and then drying the work to let a coating layer be formed on a surface of the work. For example, three-dimensional current collector 201 is immersed in the suspension described above. The resulting three-dimensional current collector 201 to which the suspension has adhered is dried. Thus, active material layer 202 may be formed on a surface of three-dimensional current collector 201.

<<(b) Formation of Porous Insulating Layer>>

The method of producing a battery according to the present embodiment includes forming porous insulating layer 30 by depositing group of inorganic nanoparticles 31 and group of polymer particles 32 on at least one of a surface of positive electrode 10 and a surface of negative electrode 20 with electrophoretic deposition (EPD). Each inorganic nanoparticle in group of inorganic nanoparticles 31 is a dielectric.

Formation of porous insulating layer 30 by EPD is expected to make the inorganic nanoparticles be close to each other in porous insulating layer 30. When the inorganic nanoparticles are thus close to each other, a great effect of promoting dissociation of the supporting salt is expected to be obtained, EPD is considered suitable for forming porous insulating layer 30 on a surface of an electrode having a cubic structure. However, a non-EPD technique capable of forming porous insulating layer 30 may also be used for forming porous insulating layer 30.

For example, group of inorganic nanoparticles 31, group of polymer particles 32, a binder, and a solvent are mixed and thus a liquid raw material is prepared. Group of inorganic nanoparticles 31 and group of polymer particles 32, for example, are described above in detail. In the mixing process, an ultrasonic mixer may be used, for example. Desirably, the viscosity of the liquid raw material is low enough for group of inorganic nanoparticles 31 and group of polymer particles 32 to be able to readily respond to the electric field. The viscosity of the liquid raw material may be adjusted by changing the solid-content ratio, for example. The solid-content ratio of the liquid raw material may be not lower than 5 mass % and not higher than 20 mass %, for example. The solid-content ratio refers to a mass ratio of all the components in the liquid raw material except the solvent.

The solvent is selected, as appropriate, depending on the type of the binder. In order to stabilize the charged state of group of inorganic nanoparticles 31 and group of polymer particles 32, an electrifying agent and/or the like may be added to the liquid raw material.

Figure 6:
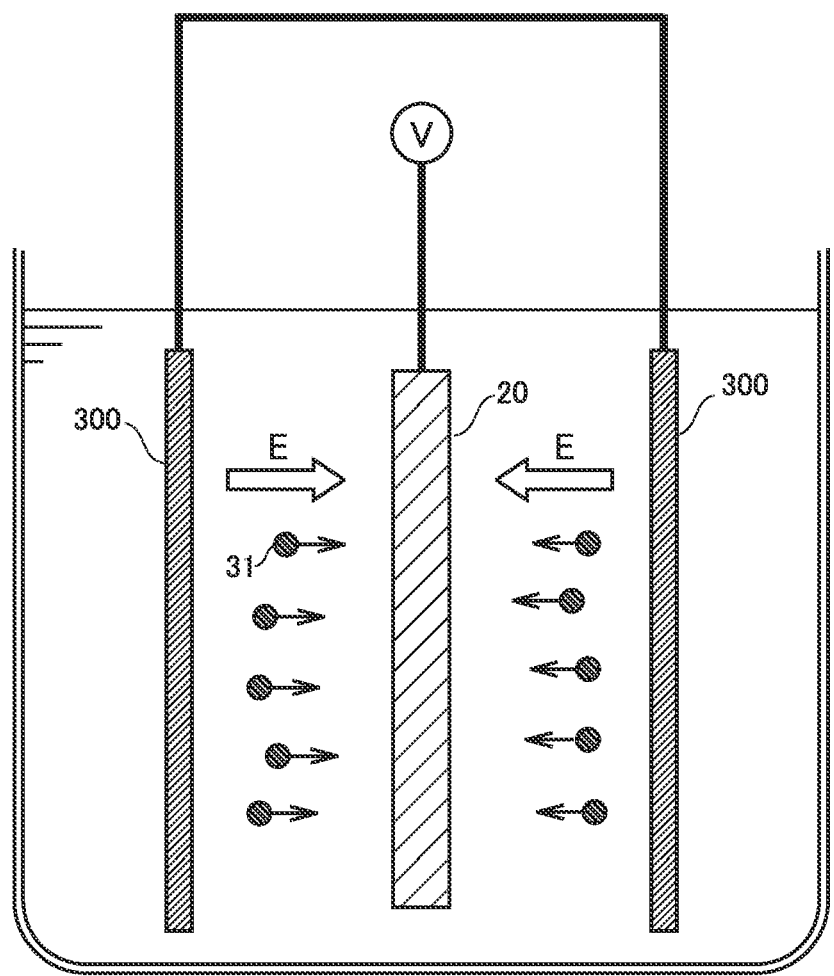
FIG. 6 is a conceptual view illustrating the method of forming the porous insulating layer according to the present embodiment.

FIG. 6 is a conceptual view illustrating the method of forming the porous insulating layer according to the present embodiment.

The liquid raw material is added to a treatment bath. The liquid raw material in the treatment bath may be stirred with, for example, a stirrer. An electrode is immersed in the liquid raw material. In this embodiment, negative electrode 20 is immersed in the liquid raw material. Metal plates 300 are also immersed in the liquid raw material. Metal plates 300 are made of a metal material that has an excellent conductivity. Negative electrode 20 and metal plates 300 are immobilized in such a way that they are separated from each other by a certain distance.

Negative electrode 20 and metal plates 300 are connected to an external power source. Negative electrode 20 is connected to the anode of the external power source. In the case in which the electrode is positive electrode 10, positive electrode 10 is connected to the cathode of the external power source. The external power source applies AC voltage between negative electrode 20 and metal plates 300, and as a result, an electric field (E) is generated between negative electrode 20 and metal plates 300. Group of inorganic nanoparticles 31 and group of polymer particles 32 are attracted to negative electrode 20, and then group of inorganic nanoparticles 31, group of polymer particles 32, and the like are deposited on a surface of negative electrode 20. In other words, porous insulating layer 30 is formed. For convenience, group of polymer particles 32 is not shown in FIG. 6.

Properties of porous insulating layer 30, such as the thickness and the porosity, can be adjusted by selecting a different combination of the applied voltage, the AC frequency, and the duration of treatment, for example. The formation of porous insulating layer 30 is followed by drying porous insulating layer 30 and the electrode.

<<(c) Formation of Electrode Array>>

The method of producing a battery according to the present embodiment includes forming electrode array 40 by disposing positive electrode 10 and negative electrode 20 in such a way that porous insulating layer 30 is interposed between positive electrode 10 and negative electrode 20.

In the case in which positive electrode 10 and negative electrode 20 are planar, for example, electrode array 40 may be formed by stacking positive electrode 10 and negative electrode 20 in such a way that porous insulating layer 30 is interposed between positive electrode 10 and negative electrode 20 and then winding positive electrode 10 and negative electrode 20 in a spiral fashion.

When the electrodes are three-dimensional electrodes 200, for example, then electrode array 40 may be formed by forming porous insulating layer 30 on a surface of one of active material layers 202 and then forming a counter electrode so as to fill the pores (namely, the space that remains unoccupied).

<<(d) Impregnation with Electrolyte Solution>>

The method of producing a battery according to the present embodiment includes impregnating electrode array 40 with an electrolyte solution to produce battery 100. Each inorganic nanoparticle in group of inorganic nanoparticles 31 is in contact with the electrolyte solution by impregnating electrode array 40 with the electrolyte solution.

Electrode array 40 is placed inside case 50, for example. Case 50 is described above in detail. The electrolyte solution is injected into case 50. The electrolyte solution is described above in detail. Case 50 is hermetically sealed. Within case 50, electrode array 40 is impregnated with the electrolyte solution. In this way, battery 100 may be produced.

EXAMPLES

In the following, examples according to the present disclosure are described. The scope of claims is not limited to the description below.

<First Group of Experiments>

Battery 100 (Nos. 1 to 8) was produced in a first group of experiments, and the resistance thereof was measured. Nos. 3 to 6 correspond to examples. Nos. 1 and 2 correspond to reference examples. Nos. 7 and 8 correspond to comparative examples.

<No. 1>

<<(a) Preparation of Electrodes>>

The materials described below were prepared.

Negative electrode active material particles: natural graphite
Binder: CMC and SBR
Solvent: ion-exchanged water
Negative electrode current collector: electrolytic copper foil The negative electrode active material particles, the binder, and the solvent were mixed, and thus a suspension was prepared. The resulting suspension was applied to a surface of the negative electrode current collector, followed by drying, and thus negative electrode 20 was prepared. Negative electrode 20 was in sheet form.

The materials described below were prepared.

Positive electrode active material particles: NCM
Conductive material: AB
Binder: PVdF
Solvent: N-methyl-2-pyrrolidone
Positive electrode current collector: Al foil The positive electrode active material particles, the conductive material, the binder, and the solvent were mixed, and thus a suspension was prepared. The resulting suspension was applied to a surface of the positive electrode current collector, followed by drying, and thus positive electrode 10 was prepared. Positive electrode 10 was in sheet form.

<<(b) Formation of Porous Insulating Layer>>

The materials described below were prepared.

Group of inorganic nanoparticles 31: fumed silica (average particle size, 7 nm)
Binder: SBR
Solvent: ion-exchanged water Group of inorganic nanoparticles 31, the binder, and the solvent were mixed with an ultrasonic mixer, and thus a liquid raw material was prepared. The resulting liquid raw material was added to a treatment bath.

In the liquid raw material, negative electrode 20 and metal plates 300 were immersed. An external power source was prepared. Negative electrode 20 was connected to the anode of the external power source. Metal plates 300 were connected to the cathode of the external power source. The external power source applied AC voltage between negative electrode 20 and metal plates 300 and as a result, porous insulating layer 30 was formed on a surface of negative electrode 20. Porous insulating layer 30 had a thickness of 25 μm. Negative electrode 20 and porous insulating layer 30 were dried.

<<(c) Formation of Electrode Array>>

Positive electrode 10 and negative electrode 20 were stacked in such a way that porous insulating layer 30 was interposed between positive electrode 10 and negative electrode 20, and thus electrode array 40 was formed.

<<(d) Impregnation with Electrolyte Solution>>

An aluminum-laminated pouch was prepared as case 50. Electrode array 40 was placed inside case 50. An electrolyte solution was injected into case 50. The electrolyte solution had a first composition, which is described below.

(First Composition)

1M $LiBF_4$, EC:DMC:EMC=3:4:3 (volume ratio)

Case 50 was hermetically sealed. Electrode array 40 was impregnated with the electrolyte solution. Thus, battery 100 was produced. The design capacity of battery 100 was about 100 mAh.

<<Measurement of Resistance>>

Battery 100 was activated. After activation, the SOC (state of charge) of battery 100 was adjusted to 60% at room temperature. Battery 100 was placed in a thermostatic chamber that had been set at 0° C. Battery 100 was discharged in this environment at a current of 500 mA for five seconds. The level of voltage drop that occurred in that five seconds elapsed after the start of the discharging was measured. The level of voltage drop was divided by the amount of current, and thus the resistance was calculated. Results are shown in Table 1 below. Each value in column "Resistance" in Table 1 below is a value relative to the resistance of No. 7 (described below), which was defined as 100.

<No. 2>

Battery 100 was produced in the same manner as in the production of No. 1 except that barium titanate (average particle size, 25 μm) was used instead of fumed silica.

<Nos. 3 to 6>

As group of polymer particles 32, PE particles (Chemipearl (registered trademark) manufactured by Mitsui Chemicals, Inc., with an average particle size of 3 μm) were prepared. Battery 100 was produced in the same manner as in the production of No. 1 except that group of polymer particles 32 was mixed in the liquid raw material so that the volume ratio between group of inorganic nanoparticles 31 and group of polymer particles 32 in porous insulating layer 30 was as specified in Table 1 below.

<No. 7>

Battery 100 was produced in the same manner as in the production of No. 1 except that porous insulating layer 30 containing group of polymer particles 32 but not containing group of inorganic nanoparticles 31 was formed.

<No. 8>

Battery 100 was produced in the same manner as in the production of No. 1 except that finned silica (average particle size, 3 μm (3000 nm)) was used as group of inorganic nanoparticles 31.

TABLE 1

First group of experiments

Porous insulating layer

| | Group of inorganic nanoparticles (A) | Group of polymer particles (B) | Inorganic nanoparticles | | Polymer particles | | Binder | | | |
|---|---|---|---|---|---|---|---|---|---|---|
| | Volume ratio (A:B) | | Type | Average particle size [nm] | Type | Average particle size [μm] | Type | Content [mass %] | Thickness [μm] | Resistance* [—] |
| 1 | 100 | 0 | $SiO_2$ | 7 | — | — | SBR | 3 | 25 | 68 |
| 2 | 100 | 0 | $BaTiO_3$ | 25 | — | — | SBR | 3 | 25 | 61 |
| 3 | 95 | 5 | $SiO_2$ | 7 | PE | 3 | SBR | 3 | 25 | 70 |
| 4 | 75 | 25 | $SiO_2$ | 7 | PE | 3 | SBR | 3 | 25 | 73 |
| 5 | 50 | 50 | $SiO_2$ | 7 | PE | 3 | SBR | 3 | 25 | 76 |
| 6 | 25 | 75 | $SiO_2$ | 7 | PE | 3 | SBR | 3 | 25 | 93 |
| 7 | 0 | 100 | — | — | PE | 3 | SBR | 3 | 25 | 100 |
| 8 | 100 | 0 | $SiO_2$ | 3000 | — | — | SBR | 3 | 25 | 101 |

*Each value is a value relative to the resistance of No. 7, which is defined as 100.
Composition of electrolyte solution (first composition): 1M $LiBF_4$, EC:DMC:EMC = 3:4:3 (volume ratio)

<Results from First Group of Experiments>

No. 7 had a high resistance. The reason is considered that porous insulating layer 30 did not contain group of inorganic nanoparticles 31.

No. 8 had a high resistance. The reason is considered that the inorganic particles in porous insulating layer 30 were not nanoparticles.

Each of Nos. 1 to 6 had a resistance lower than that of No. 7 or 8. The reason is considered that porous insulating layer 30 containing group of inorganic nanoparticles 31 promoted dissociation of the supporting salt. No. 2 had a resistance lower than that of No. 1. The reason is considered that the inorganic nanoparticles were ferroelectrics. It should be noted that neither No. 1 nor 2 contained group of polymer particles 32 in porous insulating layer 30. Therefore, it is considered that porous insulating layer 30 of neither No. 1 nor 2 has a shut-down function or elasticity.

Based on the results from Nos. 1 and 2, it is considered that replacing the dielectric (fumed silica) by a ferroelectric (barium titanate) in the configurations of Nos. 3 to 6 would result in a reduction in resistance.

Figure 7:
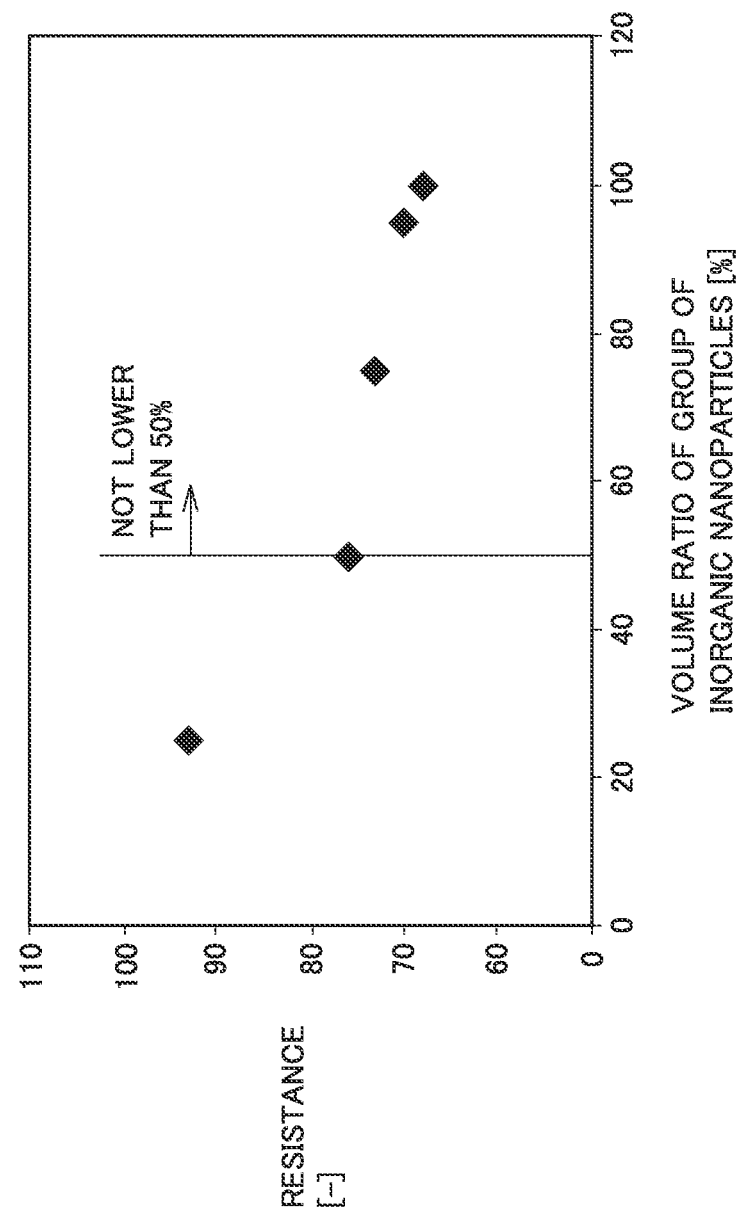
FIG. 7 is a graph showing the relationship between the volume ratio and the resistance of the group of inorganic nanoparticles.

FIG. 7 is a graph showing the relationship between the volume ratio and the resistance of the group of inorganic nanoparticles.

FIG. 7 shows results from Nos. 1 and 3 to 6. The volume ratio of group of inorganic nanoparticles 31 was not lower than 50%, and therefore a great effect of reducing resistance tended to be obtained.

<Second Group of Experiments>

Battery 100 (Nos. 9 and 10) was produced in a second group of experiments, and the resistance thereof was measured. Nos. 9 and 10 correspond to comparative examples. Results of resistance measurement are shown in Table 2 below. Each value in column "Resistance" in Table 2 below is a value relative to the resistance of No. 9, which was defined as 100.

Battery 100 was produced in the same manner as in the production of No. 7 except that porous insulating layer 30 was not formed on a surface of negative electrode 20 and a porous PE film (thickness, 20 μm) was interposed between positive electrode 10 and negative electrode 20.

<No. 10>

As group of inorganic nanoparticles 31, fumed silica (average particle size, 7 nm) was prepared. Group of inorganic nanoparticles 31, CMC, SBR, and water were mixed, and thus a particle dispersion was prepared. The mixing ratio of the solid contents was "(group of inorganic nanoparticles):CMC:SBR=96:1:3 (mass ratio)".

The particle dispersion was applied to a surface of a porous PE film (thickness, 16 μm), followed by drying, and thus an inorganic particle layer (thickness, 4 μm) was formed. The drying was carried out at a temperature of 60° C. Battery 100 was produced in the same manner as in the production of No. 9 except that the porous film having the inorganic particle layer formed thereon was interposed between positive electrode 10 and negative electrode 20.

TABLE 2

Second group of experiments

Porous insulating layer

| | Group of inorganic nanoparticles (A) | Group of polymer particles (B) | Inorganic nanoparticles | | Polymer particles | | Binder | | | |
|---|---|---|---|---|---|---|---|---|---|---|
| | Volume ratio (A:B) | | Type | Average particle size [nm] | Type | Average particle size [μm] | Type | Content [mass %] | Thickness [μm] | Resistance*[1] [—] |
| 9 | Porous PE film | | | | | | | | 20 | 100 |
| 10 | Porous PE film (thickness, 16 μm) + inorganic particle layer (thickness, 4 μm)*[2] | | | | | | | | 20 | 103 |

*[1]Each value is a value relative to the resistance of No. 10, which is defined as 100.
*[2]Composition of inorganic particle layer [$SiO_2$:CMC:SBR = 96:1:3], $SiO_2$ (average particle size, 7 nm)
Composition of electrolyte solution (first composition): 1M $LiBF_4$, EC:DMC:EMC = 3:4:3 (volume ratio)

<Results from Second Group of Experiments>

As shown in Table 2 above, forming the inorganic particle layer on a surface of the porous film did not have an effect of reducing resistance. The reason is considered that forming the additional low-resistance layer on a surface of the porous film did not change the overall resistance because the resistance of the electrolyte solution present in the porous film did not change.

<Third Group of Experiments>

Battery 100 (Nos. 11 and 12) was produced in a third group of experiments, and the resistance thereof was measured. Nos. 11 and 12 correspond to reference examples. Results of resistance measurement are shown in Table 3 below. Each value in column "Resistance" in Table 3 below is a value relative to the resistance of No. 12, which was defined as 100.

<No. 11>

An electrolyte solution having a second composition, which is described below, was prepared. Battery 100 was produced in the same manner as in the production of No. 1 except that the electrolyte solution having the second composition was used.

(Second Composition)

1M $LiPF_6$, EC:DMC:EMC=3:4:3 (volume ratio)

<No. 12>

Battery 100 was produced in the same manner as in the production of No. 7 except that the electrolyte solution having the second composition was used.

TABLE 3

Third group of experiments

| | | Porous insulating layer | | | | | | |
|---|---|---|---|---|---|---|---|---|
| Group of inorganic nanoparticles | Group of polymer particles | Inorganic nanoparticles | | Polymer particles | | Binder | | |
| (A) Volume ratio (A:B) | (B) | Type | Average particle size [nm] | Type | Average particle size [μm] | Type | Content [mass %] | Thickness [μm] | Resistance* [—] |
| 100 | 0 | $SiO_2$ | 7 | — | — | SBR | 3 | 25 | 91 |
| 0 | 100 | — | — | PE | 3 | SBR | 3 | 25 | 100 |

*Each value is a value relative to the resistance of No. 12, which is defined as 100.
Composition of electrolyte solution (second composition): 1M $LiPF_6$, EC:DMC:EMC = 3:4:3 (volume ratio)

<Results from Third Group of Experiments>

No. 12 had a high resistance. The reason is considered that porous insulating layer 30 did not contain group of inorganic nanoparticles 31. No. 11 had a resistance lower than that of No. 12. It should be noted that the decrement in resistance measured in the third group of experiments was smaller than the decrement in resistance measured in the first group of experiments (namely, the difference in resistance between No. 1 and No. 7). The reason can be explained by the degree of dissociation of the supporting salt, as follows: it is considered that the supporting salt having the second composition ($LiPF_6$) dissociated more readily than the supporting salt having the first composition ($LiBF_4$) did; because the supporting salt thus readily dissociated, No. 12 had a substantial number of charge carriers (lithium ions) generated therein even without group of inorganic nanoparticles 31; and as a result, the difference in resistance between No. 11 and No. 12 was smaller.

The embodiments and examples disclosed herein are illustrative and non-restrictive in any respect. The technical scope indicated by the claims is intended to include any modifications within the scope and meaning equivalent to the terms of the claims.

What is claimed is:

1. A battery comprising at least:
   an electrode array; and
   an electrolyte solution,
   the electrolyte solution comprising at least a solvent and a supporting salt,
   the electrode array comprising at least a positive electrode, a porous insulating layer, and a negative electrode,
   the porous insulating layer being interposed between the positive electrode and the negative electrode,
   the porous insulating layer comprising at least a group of inorganic nanoparticles and a group of polymer particles,
   each inorganic nanoparticle in the group of inorganic nanoparticles being a dielectric,
   each inorganic nanoparticle in the group of inorganic nanoparticles being in contact with the electrolyte solution,
   the group of polymer particles consisting of a plurality of polymer particles,
   each inorganic nanoparticle in the group of inorganic nanoparticles being at least one selected from the group consisting of silica, barium titanate, strontium titanate, lead zirconate titanate, and potassium sodium tartrate,
   the polymer particles have an average particle size not smaller than 1 μm and not greater than 10 μm, and
   the inorganic nanoparticles have an average particle size not smaller than 1 nm and not greater than 100 nm.

2. The battery according to claim 1, wherein the group of inorganic nanoparticles and the group of polymer particles satisfy the following relationship:
   (group of inorganic nanoparticles):(group of polymer particles)=50:50 to 95:5 (volume ratio).

3. The battery according to claim 1, wherein each inorganic nanoparticle in the group of inorganic nanoparticles is a ferroelectric.

4. The battery according to claim 1, wherein the porous insulating layer is supported on at least one of a surface of the positive electrode and a surface of the negative electrode.

5. The battery according to claim 4, wherein the electrode that supports the porous insulating layer has a three-dimensional network structure.

6. The battery according to claim 1, wherein an average particle size of the polymer particles is greater than an average particle size of the inorganic nanoparticles.

7. The battery according to claim 1, wherein each of the polymer particles in the group of polymer particles is dispersed throughout the porous insulating layer.

8. The battery according to claim 1, wherein the porous insulating layer is a particle layer.

9. The battery according to claim 1, wherein the porous insulating layer comprises a mixture of the group of inorganic nanoparticles and the group of polymer particles.

10. The battery according to claim 1, wherein the group of inorganic nanoparticles and the group of polymer particles satisfy the following relationship:

(group of inorganic nanoparticles):(group of polymer particles)=75:25 to 95:5 (volume ratio).

11. A method of producing a battery, comprising at least:
preparing a positive electrode and a negative electrode;
forming a porous insulating layer by depositing a group of inorganic nanoparticles and a group of polymer particles on at least one of a surface of the positive electrode and a surface of the negative electrode with electrophoretic deposition;
forming an electrode array by disposing the positive electrode and the negative electrode in such a way that the porous insulating layer is interposed between the positive electrode and the negative electrode; and
impregnating the electrode array with an electrolyte solution to produce the battery,
the electrolyte solution comprising at least a solvent and a supporting salt,
each inorganic nanoparticle in the group of inorganic nanoparticles being a dielectric,
each inorganic nanoparticle in the group of inorganic nanoparticles being in contact with the electrolyte solution by impregnating the electrode array with the electrolyte solution,
the group of polymer particles consisting of a plurality of polymer particles,
each inorganic nanoparticle in the group of inorganic nanoparticles being at least one selected from the group consisting of silica, barium titanate, strontium titanate, lead zirconate titanate, and potassium sodium tartrate,
the polymer particles have an average particle size not smaller than 1 μm and not greater than 10 μm, and
the inorganic nanoparticles have an average particle size not smaller than 1 nm and not greater than 100 nm.

12. The method according to claim 11, wherein the group of inorganic nanoparticles and the group of polymer particles satisfy the following relationship:

(group of inorganic nanoparticles):(group of polymer particles)=50:50 to 95:5 (volume ratio).

13. The method according to claim 11, wherein the group of inorganic nanoparticles and the group of polymer particles satisfy the following relationship:

(group of inorganic nanoparticles):(group of polymer particles)=75:25 to 95:5 (volume ratio).

* * * * *